United States Patent
Zhou et al.

(10) Patent No.: US 9,183,016 B2
(45) Date of Patent: Nov. 10, 2015

(54) ADAPTIVE TASK SCHEDULING OF HADOOP IN A VIRTUALIZED ENVIRONMENT

(71) Applicant: VMware, Inc., Palo Alto, CA (US)

(72) Inventors: Li Zhou, Campbell, CA (US); Sandeep Uttamchandani, Cupertino, CA (US); Yizheng Chen, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 275 days.

(21) Appl. No.: 13/778,441

(22) Filed: Feb. 27, 2013

(65) Prior Publication Data

US 2014/0245298 A1    Aug. 28, 2014

(51) Int. Cl.
*G06F 9/455* (2006.01)
*G06F 9/50* (2006.01)

(52) U.S. Cl.
CPC ............ *G06F 9/455* (2013.01); *G06F 9/45558* (2013.01); *G06F 9/505* (2013.01); *G06F 2009/45591* (2013.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 5,805,599 | A | * | 9/1998 | Mishra et al. ................. 370/468 |
| 6,542,950 | B1 | * | 4/2003 | Bodnar ....................... 710/260 |
| 6,898,664 | B2 | * | 5/2005 | Matthews et al. ............. 711/112 |
| 8,356,050 | B1 | * | 1/2013 | Olston et al. ................. 707/769 |
| 8,856,797 | B1 | * | 10/2014 | Siddiqui et al. ............... 718/104 |
| 2002/0087611 | A1 | * | 7/2002 | Tanaka et al. ..................... 709/1 |
| 2008/0126646 | A1 | * | 5/2008 | Sakanaka et al. ............. 710/119 |
| 2011/0119031 | A1 | * | 5/2011 | Castro et al. .................. 702/181 |
| 2011/0314465 | A1 | * | 12/2011 | Smith et al. ....................... 718/1 |
| 2012/0198466 | A1 | * | 8/2012 | Cherkasova et al. .......... 718/104 |
| 2012/0317583 | A1 | * | 12/2012 | Corbea et al. ................. 718/104 |
| 2014/0026144 | A1 | * | 1/2014 | Pack ............................. 718/105 |
| 2014/0082625 | A1 | * | 3/2014 | Busaba et al. ................ 718/104 |

* cited by examiner

*Primary Examiner* — Emerson Puente
*Assistant Examiner* — Zhi Chen

(57) ABSTRACT

A control module is introduced to communicate with an application workload scheduler of a distributed computing application, such as a Job Tracker node of a Hadoop cluster, and with the virtualized computing environment underlying the application. The control module periodically queries for resource consumption data, such as CPU utilization, and uses the data to calculate how MapReduce task slots should be allocated on each task node of the Hadoop cluster. The control module passes the task slot allocation to the application workload scheduler, which honors the allocation by adjusting task assignments to task nodes accordingly. The task nodes may also activate and deactivate task slots according to the changed slot allocation. As a result, the distributed computing application is able to scale up and down when other workloads sharing the virtualized computing environment change.

19 Claims, 6 Drawing Sheets

ADAPTIVE TASK SCHEDULING OF HADOOP IN A VIRTUALIZED ENVIRONMENT

BACKGROUND

Distributed computing platforms, such as Hadoop or other MapReduce-related frameworks, include software that allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platforms typically utilize a distributed file system that can support input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

SUMMARY

One or more embodiments disclosed herein provide a method for managing resources for a first application comprising a distributed computing application. The method includes receiving a first performance metric for a host computer having a first plurality of virtual machines (VMs) controlled by the distributed computing application and a second plurality of VMs controlled by a second application. The method further includes determining a state of resource contention between the distributed computing application and the second application based on the first performance metric. The method includes modifying an allocation of task slots associated with the host computer based on the first performance metric. Each task slot represents a capability to handle a unit of work for the distributed computing application. The method includes transmitting the modified allocation of task slots to a scheduler, wherein the scheduler is configured to assign a plurality of tasks to be executed in the first plurality of VMs controlled by the distributed computing application based on the modified allocation of task slots.

Another embodiment disclosed herein provides a method for managing resources for a first application comprising a distributed computing application. The method includes receiving an allocation of task slots associated with a host computer having a first plurality of virtual machines (VMs) controlled by the distributed computing application and a second plurality of VMs controlled by a second application. The first plurality of VMs may comprise a first task node. The method further includes determining an assignment of a first task for the distributed computing application to a first task slot on the first task node based on the received allocation of task slots. The received allocation of task slots includes an allocation of task slots for the first task node. The method further includes transmitting, to the first task node, a heartbeat message having the assignment of the first task and the allocation of task slots for the first task node.

Another embodiment disclosed herein provides a method for managing resources of a host computer having a first plurality of virtual machines (VMs) controlled by a distributed computing application and a second plurality of VMs controlled by a second application. The first plurality of VMs may comprise a first task node. The method includes receiving an allocation of task slots for a first task tracker executing on one of the first plurality of VMs, and modifying at least one of a plurality of task slots managed by the first task tracker based on the allocation of task slots. Each task slot may represent a capability to handle a unit of work for the distributed computing application. The method further includes transmitting, to a job tracker, a heartbeat message indicating an updated status and availability of the plurality of task slots.

Further embodiments of the present invention include a non-transitory computer-readable storage medium that includes instructions that enable a processing unit to implement one or more of the methods set forth above or the functions of the computer system set forth above.

DETAILED DESCRIPTION

One or more embodiments disclosed herein provide methods, systems, and computer programs for adaptive task scheduling of a distributed computing application, such as Hadoop, on computing resources in a virtualized environment having a set of virtual machines. Due to the dynamic nature of the consolidated virtual environment, the distributed computing application may need to account for the resources consumed by virtual machines not under its management and for its workload's importance relative to those other virtual machines. A control module queries cluster-wide resource consumption data (e.g., CPU and memory utilization) and detects whether the distributed computing application is contending with other workloads in the virtualized environment for resources. The control may adjust an allocation of "slots" for performing tasks on each node of the distributed computing application based on the availability of memory and CPU resources.

Figure 1:
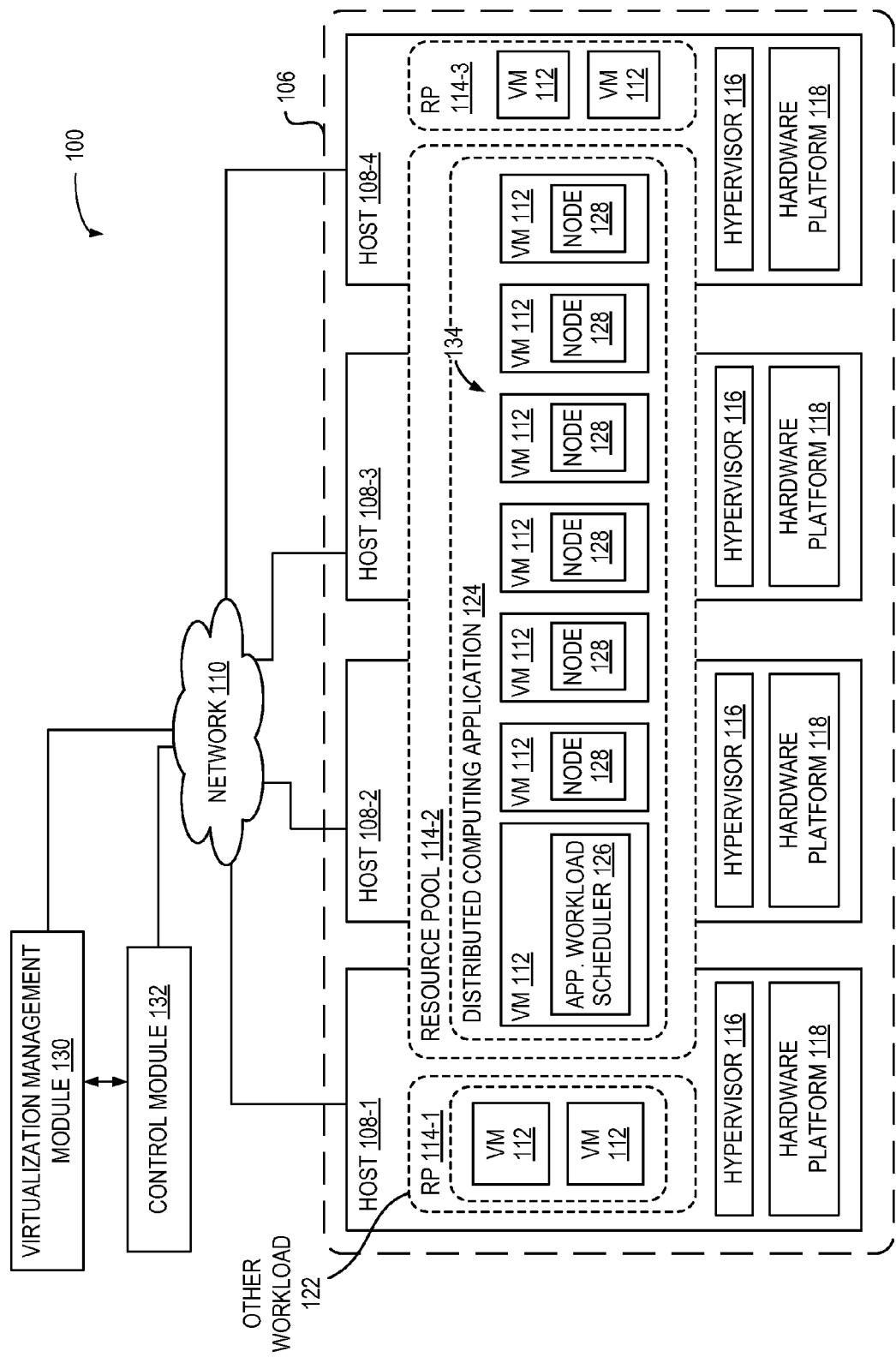
FIG. 1 is a block diagram that illustrates a virtualized computing system with which one or more embodiments of the present invention may be utilized.

FIG. 1 is a block diagram that illustrates a computing system 100 with which one or more embodiments of the present invention may be utilized. As illustrated, computing system 100 includes a host group 106 of host computers, identified as hosts 108-1, 108-2, 108-3, and 108-4, and referred to collectively as hosts 108. Each host 108 is configured to provide a virtualization layer that abstracts processor, memory, storage, and networking resources of a hardware platform 118 into multiple virtual machines (VMs) 112 that run concurrently on the same host 108. The VMs 112 run on top of a software interface layer, referred to herein as a hypervisor 116, that enables sharing of the hardware resources of host 108 by the VMs 112. One example of hypervisor 116 that may be used in an embodiment described herein is a VMware ESXi hypervisor provided as part of the VMware vSphere solution made commercially available from VMware, Inc.

In one embodiment, VMs 112 are organized into a plurality of resource pools, identified as resource pool 114-1, 114-2, and 114-3, which logically partitions available resources of hardware platforms 118, such as CPU and memory. Resource pools 114 may be grouped into hierarchies; resource pools 114 provide resources to "child" resource pools and virtual machines. Resource pools 114 enable a system administrator to organize resources of computing system 100, isolate VMs and computing resources from one resource pool to another, abstract resources from the actual hosts 108 that contribute the resources, and manage sets of VMs 112 associated with a resource pool 114. For example, a system administrator may control the aggregate allocation of resources to the set of VMs 112 by changing settings on the VMs' enclosing resource pool 114.

As shown, VMs 112 of hosts 108 may be provisioned and used to execute a number of workloads that deliver information technology services, including web services, database services, data processing services, and directory services. Some VMs 112 may be used to execute a workload of a distributed computing application 124, while other VMs 112 may be used for other workloads 122. In one embodiment, one or more VMs 112 are configured to serve as a node 128 of a cluster 134 generated and managed by a distributed computing application 124 configured to elastically distribute its workload over the nodes 128. Distributed computing application 124 may be configured to receive processing requests, and distribute the processing requests to available nodes 128 for processing. VMs 112 executing as nodes 128 on host 108 are shown in greater detail in FIG. 2.

Figure 2:
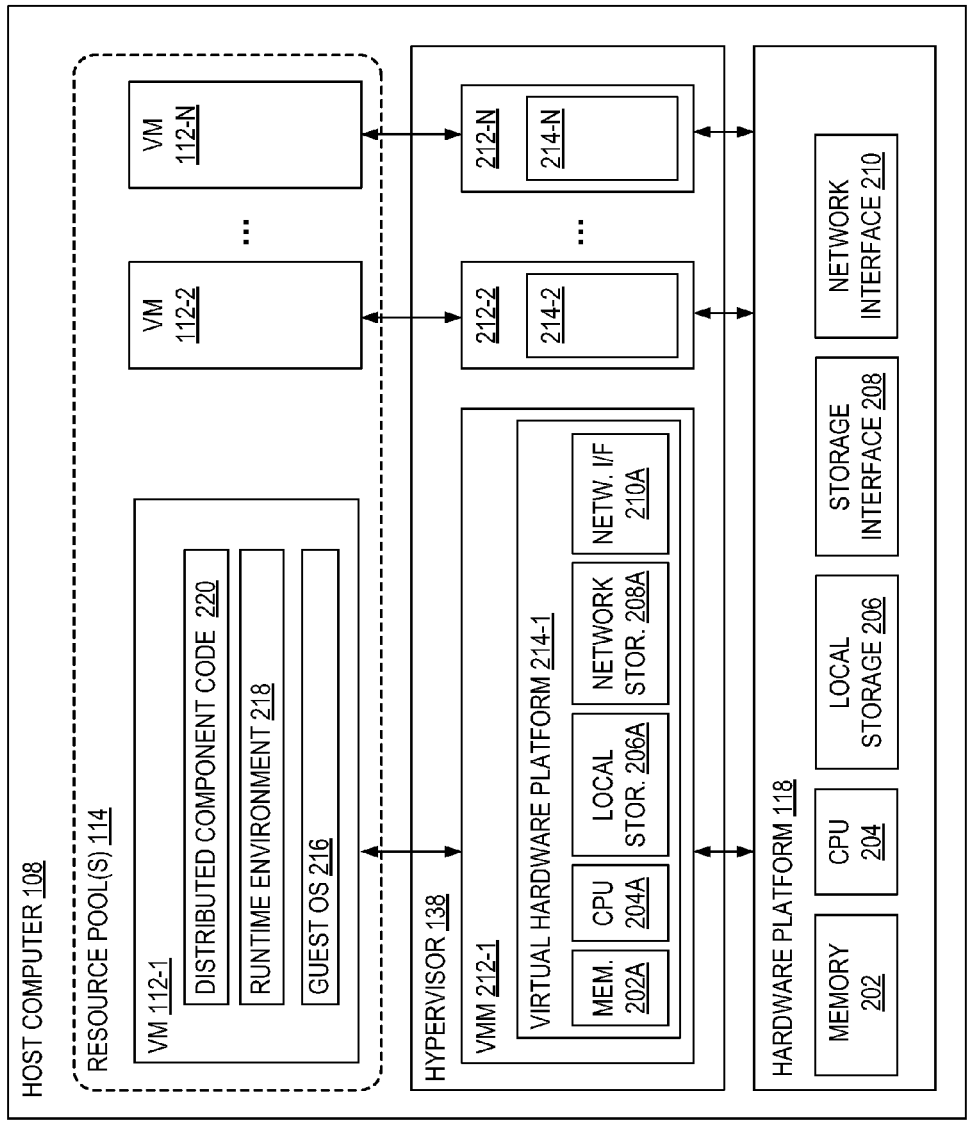
FIG. 2 is a block diagram that illustrates a host computer supporting one or more virtual machines, according to one embodiment of the present invention.

FIG. 2 is a block diagram that illustrates a host computer 108 supporting one or more virtual machines 112, according to one embodiment of the present invention. As shown, hardware platform 118 of each host 108 may include conventional components of a computing device, such as a memory 202, a processor 204, local storage 206, a storage interface 208, and a network interface 210. Processor 204 is configured to execute instructions, for example, executable instructions that perform one or more operations described herein and may be stored in memory 202 and in local storage 206. Memory 202 and local storage 206 are devices allowing information, such as executable instructions, cryptographic keys, virtual disks, configurations, and other data, to be stored and retrieved. Memory 202 may include, for example, one or more random access memory (RAM) modules; local storage 206 may include, for example, one or more hard disks, flash memory modules, solid state disks, and optical disks. Storage interface 208 enables host 108 to communicate with one or more network data storage systems that may, for example, store "virtual disks" that are accessed by VM nodes. Examples of storage interface 208 are a host bus adapter (HBA) that couples host 108 to a storage area network (SAN) or a network file system interface. Network interface 210 enables host 108 to communicate with another device via a communication medium, such as network 110. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 108 by the virtual machines. Hypervisor 116 may run on top of the operating system of host 108 or directly on hardware components of host 108. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, local storage 206A, networked storage 208A, network interface 210A, etc.) that may, for example, function as an equivalent, conventional hardware architecture for its corresponding VM 112. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N. In the embodiment depicted in FIG. 2, each VM 112 includes a guest operating system (OS) 216 (e.g., Microsoft Windows, Linux) and one or more guest applications running on top of guest OS 216. In one embodiment, each VM 112 includes a runtime environment 218, such as a Java Virtual Machine (JVM), that supports execution of a distributed software component code 220 (e.g., Java code) for distributed computing application 124. For example, if distributed computing application 124 is a Hadoop application, a VM 112 may have a runtime environment 218 (e.g., JVM) that executes distributed software component code 220 implementing a "Job Tracker" function, "TaskTracker" function, "Name Node" function, "Secondary Name Node" function, and "Data Node" function. In another embodiment of distributed computing application 124 having a next-generation Hadoop data-processing framework (i.e., YARN), a VM 112 may have a runtime environment 218 (e.g., JVM) that executes distributed software component code 220 implementing a "Resource Manager" function (which includes a workload scheduler function), "Node Manager" function, "Task Container" function, "Application Master" function, "Name Node" function, "Data Node" function, and "Journal Node" function. Alternatively, each VM 112 may include distributed software component code 220 for distributed computing application 124 configured to run natively on top of guest OS 216.

Referring back to FIG. 1, computing system 100 includes a virtualization management module 130 that may communicate to the plurality of hosts 108 via network 110. In one embodiment, virtualization management module 130 is a computer program that resides and executes in a central server, which may reside in computing system 100, or alternatively, running as a VM in one of hosts 108. One example of a virtualization management module is the vCenter® Server product made available from VMware, Inc. Virtualization management module 130 is configured to carry out administrative tasks for the computing system 100, including managing hosts 108, managing VMs running within each host 108, provisioning VMs, migrating VMs from one host to another host, load balancing between hosts 108, creating resource pools 114 comprised of computing resources of hosts 108 and VMs 112, modifying resource pools 114 to allocate and de-allocate VMs and physical resources, and modifying configurations of resource pools 114. In one embodiment, virtualization management module 130 is configured to communicate with hosts 108 to collect performance data and generate performance metrics (e.g., counters, statistics) related to availability, status, and performance of hosts 108, VMs 112, and resource pools 114.

In one embodiment, virtualization management module 130 is configured to provide virtual environment scheduler functionality that balances the VMs across hosts 108 of the host group 106. For example, if the resource usage on one of the VMs in a resource pool drastically changes, the virtualization management module 130 moves around VMs among the physical hosts to optimize distribution of virtual machines across the hosts. Further, if the overall workload of all VMs decreases, the virtualization management module 130 may power down some of the physical hosts and consolidate the VMs across the remaining physical hosts. One example of a virtual environment scheduler is the VMware Distributed Resource Scheduler (DRS®) product made available from VMware, Inc.

As mentioned above, distributed computing application 124 is configured to elastically distribute its workload over a plurality of nodes 128 managed by the distributed computing application 124. In one embodiment, distributed computing application 124 includes an application workload scheduler 126 (e.g., executing in a VM 112) configured to manage execution of workloads running one or more within VM nodes 128 controlled by the distributed computing application. During operation, application workload scheduler 126 may query VM nodes 128 allocated to the distributed computing application to determine their status and the availability of resources for processing additional workloads. For example, application workload scheduler 126 may query VMs 112 allocated to the distributed computing application to determine if the VMs are up, and if they are up, determine available resources from each VM for executing a portion of the workload performed by the distributed computing application as a whole.

Conventional workload schedulers for distributed computing applications (e.g., Hadoop application) are designed to manage execution of a workload on a dedicated set of physical computing elements, under an assumption that the full set of dedicated computing resources (e.g., memory and CPU) are available, as well as based on other pre-determined attributes that are relevant to the application workload's performance, including data storage and networking locality. However, such an application workload scheduler may face challenges when attempting to schedule execution of a workload within a virtualized environment, as depicted in FIG. 1, that may have computing resources consumed by other VMs not controlled by the distributed computing application. For example, application workload scheduler 126 may accept jobs (e.g., from a user) for execution by distributed computing application 124 within the virtualized environment of computing system 100. Application workload scheduler 126 may then schedule execution a received job within VM nodes 128 by splitting the job into small tasks and distributing the tasks, a process sometimes referred to as task placement, on the nodes 128 based on a scheduling or placement policy. Scheduling and placement policies typically factor in CPU and memory utilization of each node, for example, to balance use of computing resources. However, the scheduled use of computing resources for the distributed application workload does not factor in resource contention with other workloads running within the virtualized environment. For sake of discussion, a workload for distributed computing application 124 may be referred to herein as a "distributed application workload" or "application workload", where as other workloads running within the computing system 100 that are not for distributed computing application 124 (e.g., workload 122) may be referred to as "non-distributed application workloads" or "non-application workloads". For example, application workload scheduler 126 may be attempting to place a task based on availability of nodes 128 while the virtualization management module 130 is attempting to load balance both application workload VMs and non-application workload VMs across hosts 108, thereby resulting in inconsistent results. In another example, other applications may suffer a slowdown in performance when executed within a same virtualized environment as the distributed computing application, which is undesirable for higher-priority, business-critical application.

Accordingly, embodiments of the present invention provide a control module 132 configured to communicate with application workload scheduler 126 to automatically adjust task allocation based on resource availability in a shared virtualized environment. In one embodiment, control module 132 is configured to communicate (e.g., via API call) with virtualization management module 130 to obtain performance metrics of resources in VMs 112, resource pools 114, and hosts 108, and determine a state of resource contention between the application workloads and non-application workloads. Control module 132 is further configured to communicate with application workload scheduler 126 to determine how available task "slots" for performing work in the distributed computing application may be allocated among nodes 128 based on the resource metrics. In one embodiment, control module 132 is configured to maintain a counter of the number of task slots allocated to the distributed computing application, including a count of the number of task slots allocated to each host 108 and a count of the number of task slots allocated to each node 128 executing on a particular host 108.

Figure 3:
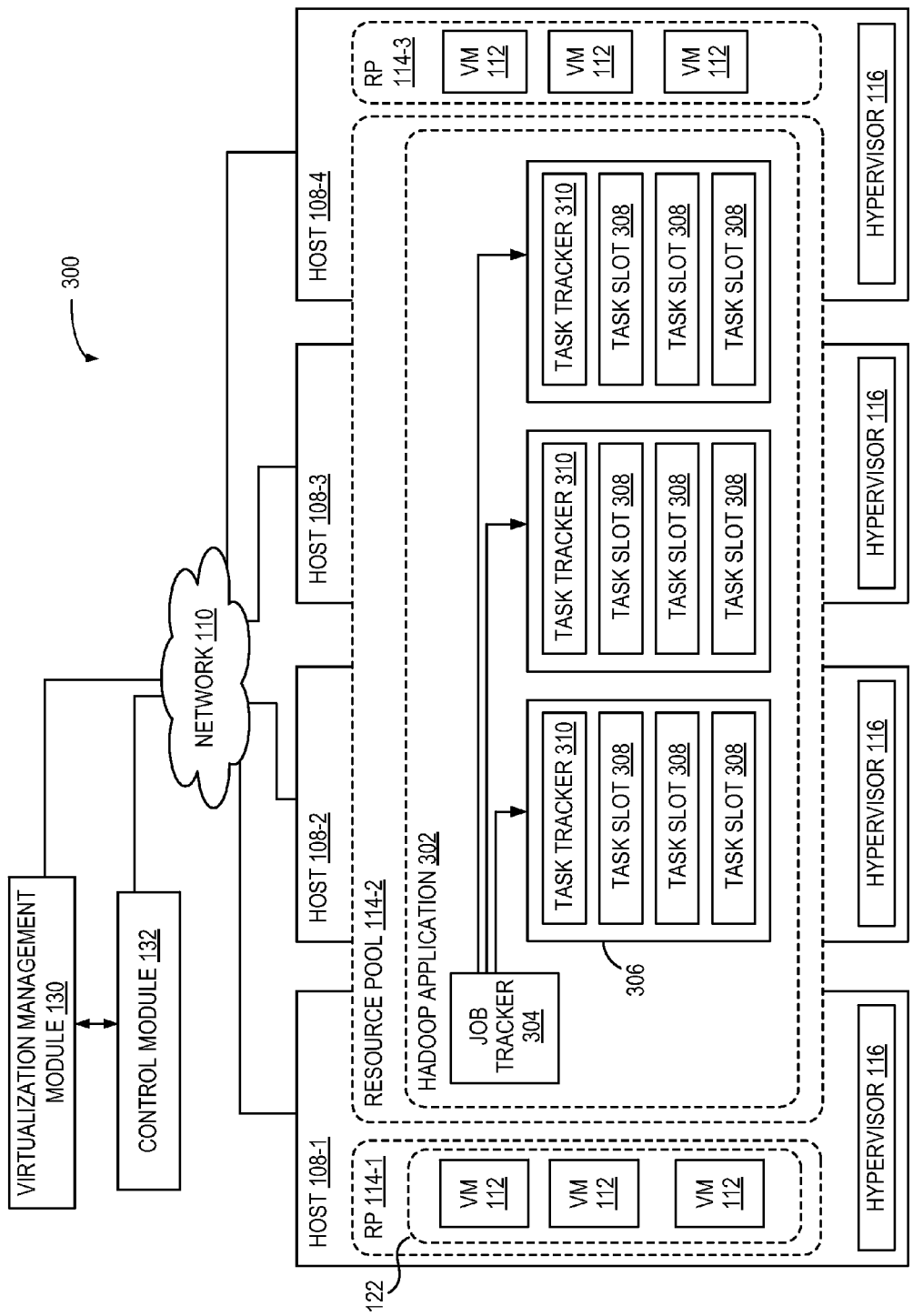
FIG. 3 is a block diagram that illustrates a virtualized computing system having a resource scheduler configured to support a Hadoop application, according to one embodiment of the present invention.

While control module 132 is depicted in FIGS. 1 and 3 as a separate component that resides and executes on a separate server or virtual machine, it is appreciated that control module 132 may alternatively reside in any one of the computing devices of the virtualized computing system 100, for example, such as the same central server where the virtualization management module 130 resides. In one implementation, control module 132 may be embodied as a plug-in component configured to extend functionality of virtualization management module 130. Further, while control module 132 is depicted as a separate entity from application workload scheduler 126, it should be appreciated that in some alternative embodiments, some or all of functionality of control module 132 may be incorporated into application workload scheduler 126.

Example Hadoop Application with Adaptive Task Scheduling

FIG. 3 is a block diagram that illustrates a virtualized computing system 300 having a control module 132 configured to support an example distributed computing application, according to one embodiment of the present invention. In the embodiment shown in FIG. 3, the distributed computing application is a Hadoop application 302 configured to process a large set of data using a distributed set of workload nodes (e.g., VMs 112) allocated to Hadoop application 302. It should be recognized that alternative architectures for a Hadoop application having some form of an application workload scheduler may be utilized with the techniques described herein. It should be further recognized that, while embodiments of present invention are described in terms of a Hadoop installation, other distributed computing applications, such as web applications having a front end scheduler or large scalable database system (e.g., MongoDB, Apache Cassandra), may be configured and utilized according to the techniques provided herein.

In one embodiment, Hadoop application 302 includes an application workload scheduler, referred to herein as a job tracker 304, which accepts Hadoop jobs from clients and schedules corresponding workloads for execution on a plurality of task nodes 306 that are part of Hadoop application 302. Each task node 306 (e.g., a VM 112) is a worker node that carries out tasks (e.g., map tasks, reduce tasks of a MapReduce job) provided by job tracker 304. Each task node 306 may handle multiple tasks in parallel. As shown, each task node 306 may have a number of available task slots 308 that represent a capability to handle a unit of work for the Hadoop application. Each task (e.g., map or reduce task) performed by the node takes up one task slot 308. In some embodiments, each task slot 308 may be implemented as an instance of a runtime environment (e.g., Java Virtual Machine) executing distributed software component code (e.g., code 220) for completing a single task. As such, each task node 306 may execute multiple instances of the runtime environment to execute in parallel multiple tasks assigned to the task node by the job tracker 304.

When job tracker 304 receives a request to execute a job within Hadoop application 302, job tracker 304 considers what resources (e.g., task slots 308) should be considered as available for executing the requested job and the availability of those resources on a per-node basis. Additionally, job tracker 304 tracks task slot 308 availability and other scheduling invariants when determining how to distribute work among the task nodes 306. If a task node 306 fails due to software error, network problems, or other issues, job tracker 304 is able to adjust its scheduling of the application workload accordingly. For example, job tracker 304 may mark failed task nodes as "unavailable" for accepting tasks, and schedule placement of subsequent tasks to other slots in other task nodes based on the reduced amount of available resources.

According to one embodiment, the control module 132 is configured to communicate with the job tracker 304 to adjust task scheduling based on available resources in the virtualized computing system 300 as determined to be available by metrics provided by virtualization management module 130. In some embodiments, the control module 132 and job tracker 304 coordinate to determine a modified number and distribution of task slots 308 within task nodes 306 based on resource contention detected in hosts 108 between application workloads and non-application workloads. As such, the control module 132 and job tracker 304 may change the number of tasks that a task node 306 can handle simultaneously depending on the resource load of its underlying host 108.

In one embodiment, a task node 306 includes a per-node agent referred to as a task tracker 310 configured to manage execution of multiple tasks in parallel in one or more task slots 308 in coordination with job tracker 304. In one embodiment, each task tracker 310 is configured to communicate with the centralized job tracker 304 through the exchange of a periodic "heartbeat" message or other suitable message bus. Using the heartbeat message, a task tracker 310 may transmit task status (e.g., progress) and slot availability to job tracker 304, and receive modified slot allocations, as well as new task assignments, from job tracker 304. In one embodiment, a task tracker 310 is configured to modify a number of available task slots 308 based on slot allocations received from job tracker 304 via the heartbeat message.

Figure 4:
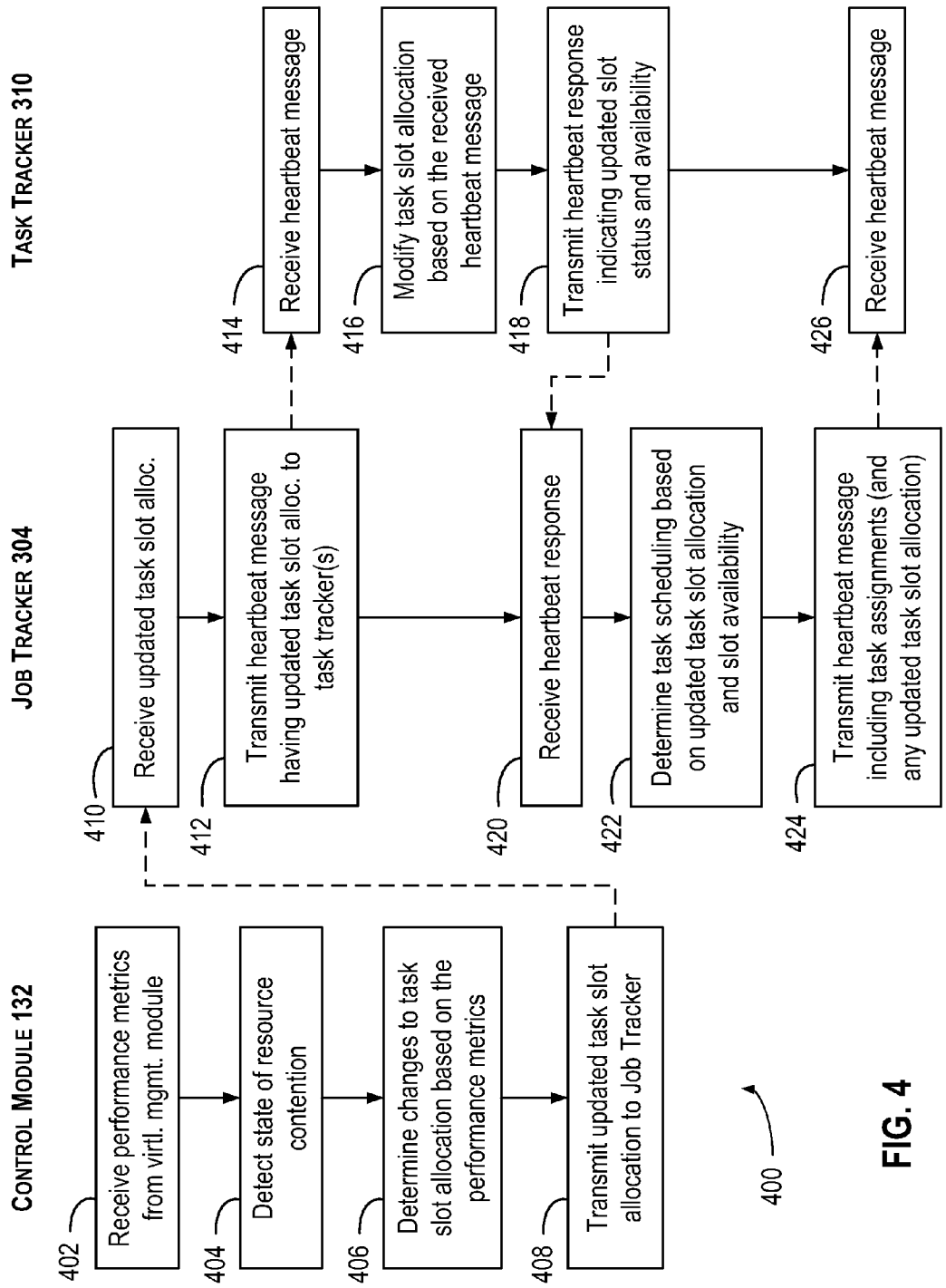
FIG. 4 is a flow diagram that illustrates steps for a method of managing a distributed computing application within a virtualized environment, according to an embodiment of the present invention.

FIG. 4 is a flow diagram that illustrates steps for a method 400 of managing a distributed computing application within a virtualized environment, according to an embodiment of the present invention. It should be recognized that, even though the method 400 is described in conjunction with the system of FIGS. 1 and 3, any system configured to perform the method steps is within the scope of embodiments of the invention.

The method 400 begins at step 402, where the control module 132 retrieves performance metrics (e.g., via an API call) from virtualization management module 130 that indicate a level of resource consumption by VMs 112 executing on hosts 108. Control module 132 may retrieve the performance metrics on a periodic basis, for example, every 5 seconds, to continually monitor resource availability for the Hadoop application. Control module 132 may track which VMs 112 within the virtualized computing system are task nodes controlled by the Hadoop application and retrieve performance metrics relating to those VMs 112. In one embodiment, the performance metrics may include metrics describing CPU and memory utilization per host 108, per VM 112, per resource pool 114, and per resource of hardware platform 118. In some embodiments, the performance metrics may include disk metrics of I/O performance, such as latency, read/write speeds, storage bandwidth consumption, and disk utilization per host, VM, or datastore. In some embodiments, the performance metrics may include performance statistics related to virtual environment scheduler functionality configured for clusters and resource pools 114 by virtualization management module 130. For sake of discussion, embodiments are described relating to resource contention of CPU resources, though it should be recognized that embodiments of the present invention may be utilized to take into account memory utilization, storage bandwidth consumption, and other resources.

At step 404, control module 132 detects a state of resource contention between workloads for the distributed computing application (e.g., Hadoop workloads) and non-distributed computing application workloads (e.g., non-Hadoop workloads 122) sharing the same computing resources of the physical hosts. In some embodiments, control module 132 may deem a state of resource contention if an overall system load for one or more physical hosts running VMs controlled by Hadoop application 302 exceeds for a certain threshold (e.g., 70% CPU load). Control module 132 may further check whether the overall system load for physical hosts discounting CPU resource consumption by VMs controlled by Hadoop application 302 exceeds a certain threshold. As such, control module 132 may deem there is no resource contention if VMs controlled by Hadoop application 302 are the primary contributor to the system load. In some embodiments, multiple threshold values may be used for detecting resource contention, as described in greater detail later in conjunction with FIG. 6.

At step 406, responsive to determining a state of resource contention, control module 132 determines changes to task slot allocation based on the performance metrics. Control module 132 may determine changes from an initial slot allocation given to each task node 306 during provisioning of the Hadoop application. In one embodiment, the initial number of task slots that a task node may be allocated may be determined based on the amount of virtual resources, such as a number of virtual CPU cores and amount of guest physical memory, the task node has been allocated. In one example, each task node 306 (e.g., embodied as a VM 112) may be given an initial task slot allocation of one task slot 308 per virtual CPU core allocated to the task node VM. As such, a task node VM having 4 virtual CPU cores may initially start with 4 task slots 308 for processing Hadoop jobs. It should be recognized that other alternative initialization schemes may be used. For example, each task node may be given an initial number of task slots (e.g., one task slot), and if resource contention is not detected during operation, the initial number of tasks slots for each task node may be doubled until a threshold value (e.g., a resource contention threshold $t_1$ described below) is reached. In some cases, the initial number of task slots may be increased until reaching a certain threshold value t, and then the system performs an additive increment after the threshold value t.

In one embodiment, control module 132 may calculate a reduced number of task slots for a given task node based on the performance metrics. In some embodiments, control module 132 may identify one or more task nodes running on a particular physical host under resource contention and calculate a reduced number of task slots for those task nodes. In some cases, control module 132 may calculate a reduced number of task slots for one or more task nodes running in a resource pool of which the underlying physical hosts are under resource contention. In other cases, control module 132 may calculate a reduced number of slots for all task nodes controlled by the Hadoop application to reduce the overall resource consumption of the Hadoop application within the virtualized computing system. In some embodiments, if resource contention continues, control module 132 may continue to reduce the number of task slots allocated for task nodes. Once control module 132 detects that resource contention is abating, control module 132 may calculate an increased number of slots for task nodes, as discussed later.

At step 408, control module 132 transmits the updated task slot allocation to job tracker 304, which receives the updated task slot allocation, at step 410. In some embodiments, the updated task slot allocation may indicate an updated number of slots for a specified task node. In other embodiments, the updated task slot allocation may indicate an updated number of slots per each task node.

At step 412, job tracker 304 transmits a heartbeat message having the updated task slot allocation to one or more task trackers 310. In one embodiment, job tracker 304 may transmit the heartbeat message at a periodic interval having a duration selected to enable the job tracker to effectuate changes in task slot allocation responsively to resource contention. For example, job tracker 304 may transmit a heartbeat message (and seek to receive a heartbeat response) every 5 seconds. At step 414, one of task trackers 310 receives the heartbeat message.

At step 416, task tracker 310 (e.g., executing on a task node) modifies the task slot allocation for that task node based on the received heartbeat message. In one embodiment, the task tracker 310 updates an internal counter indicating the number of task slots made available at the task node for performing work. The update may result in an increase in the number of task slots or a decrease in the number of task slots available at the task node.

In one embodiment, the new number of task slots (e.g., as indicated by the received heartbeat message) may be less than the current number of task slots. In this case, task tracker 310 marks one or more task slots as "inactive" to reach the new number of task slots and does not advertise their availability (e.g., in a heartbeat response back to the job tracker). Task tracker 310 may select and mark as inactive any task slot(s) currently unoccupied by a task, if there are any. In embodiments where each slot is implemented as an instance of a runtime environment (e.g., JVM) executing distributed software component code, task tracker 310 may suspend operation of the runtime environment instances corresponding to inactive slots. In other embodiment, task tracker 310 may simply allow the runtime environment instance corresponding to a task slot to idle, for example, in cases where CPU resources are highly contended.

In some cases, multiple task slots are already occupied with tasks, and task tracker 310 has insufficient free task slots to mark as inactive to satisfy the new number of task slots (i.e., the new number of task slots is less than a number of currently occupied task slots). In one embodiment, task tracker 310 selects and marks one or more occupied task slots as inactive. In some embodiments, task tracker 310 permits the work corresponding to the selected occupied task slots to reach completion, and does not advertise its availability after completion. In other embodiments, task tracker 310 preemptively removes the selected occupied task slot, for example by killing the task and aborting the work corresponding to the selected occupied task slot.

In one embodiment, the new number of task slots (e.g., as indicated by the received heartbeat message) may be greater than the current number of task slots. In this case, task tracker 310 adds additional slots to reach the new number of task slots. In some embodiments, task tracker 310 may remove an "inactive" status from one or more previously marked task slots and resume advertising their availability (e.g., to job tracker 304).

At step 418, task tracker 310 transmits a heartbeat response to job tracker 304 indicating the updated slot status and availability. The heartbeat message announces the availability of the task node and provides job tracker 304 with a status report of tasks in progress on the task node. In one embodiment, the heartbeat message may indicate an updated number of open task slots available for performing work that takes into account the updated task slot allocation. In some embodiments, the heartbeat message may include the current number of task slots at the task node and the number of "occupied" task slots at the task node, and may further confirm the number of task slots received from job tracker 304 in a previous heartbeat message.

At step 420, job tracker 304 receives the heartbeat response from one or more task tracker(s). At step 422, job tracker 304 determines task scheduling based on the received task slot allocation based on the updated task slot allocation and slot availability (e.g., as provided by task trackers 310 and control module 132). Job tracker 304 assigns tasks to be performed by each task node with an available slot according to any of a variety of scheduling algorithms, such as first-in-first-out (FIFO), fair scheduling, and capacity scheduling. Conventional Hadoop schedulers are configured to run a fixed set of physical computers and schedule tasks based on a static number of slots pre-defined in one or more configuration files processed during start-up. According to one embodiment, job tracker 304 assigns and schedules tasks in available slots of task nodes 306 while adjusting the task assignments to honor the updated number of task slots received from control module 132. For example, if job tracker 304 receives an update indicating a given task node's task slot count is reduced, job tracker 304 may schedule fewer tasks to be performed by that task node.

At step 424, job tracker 304 transmits a heartbeat message to task tracker 310 that includes the determined task assignments for that task node as well as any new updated task slot allocations (e.g., as provided by control module 132). At step 426, task tracker 310 receives the heartbeat message indicating new task assignments and may proceed to run the assigned tasks with available task slots, for example, by processing work within an instance of a runtime environment corresponding to the task slot.

Figure 5A:
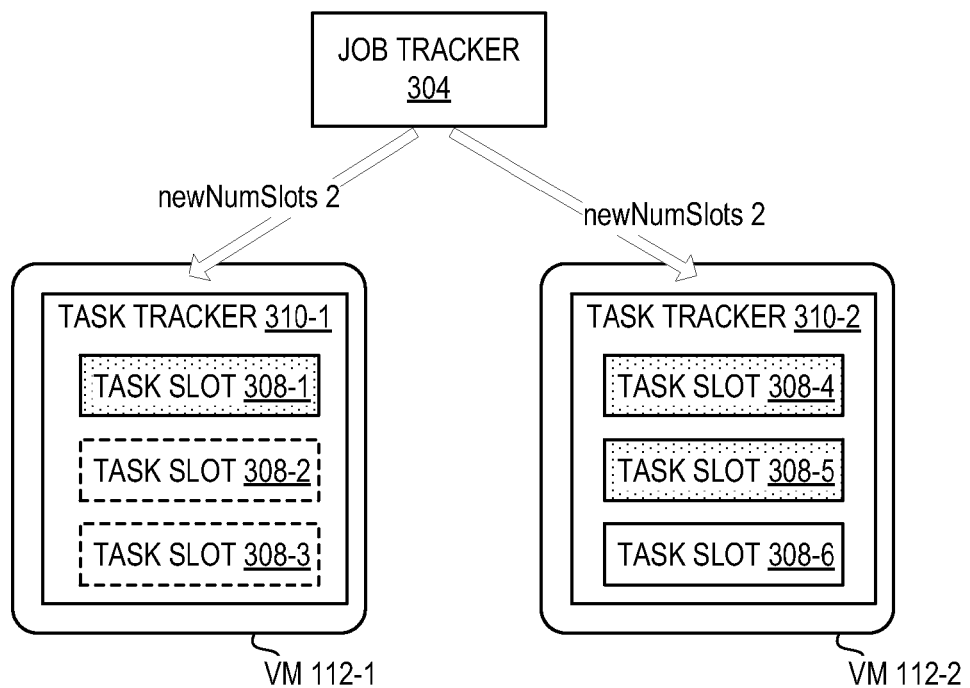
FIGS. 5A and 5B is a block diagram that illustrates an example of dynamically allocating task slots, according to one embodiment of the present invention.
Figure 5B:
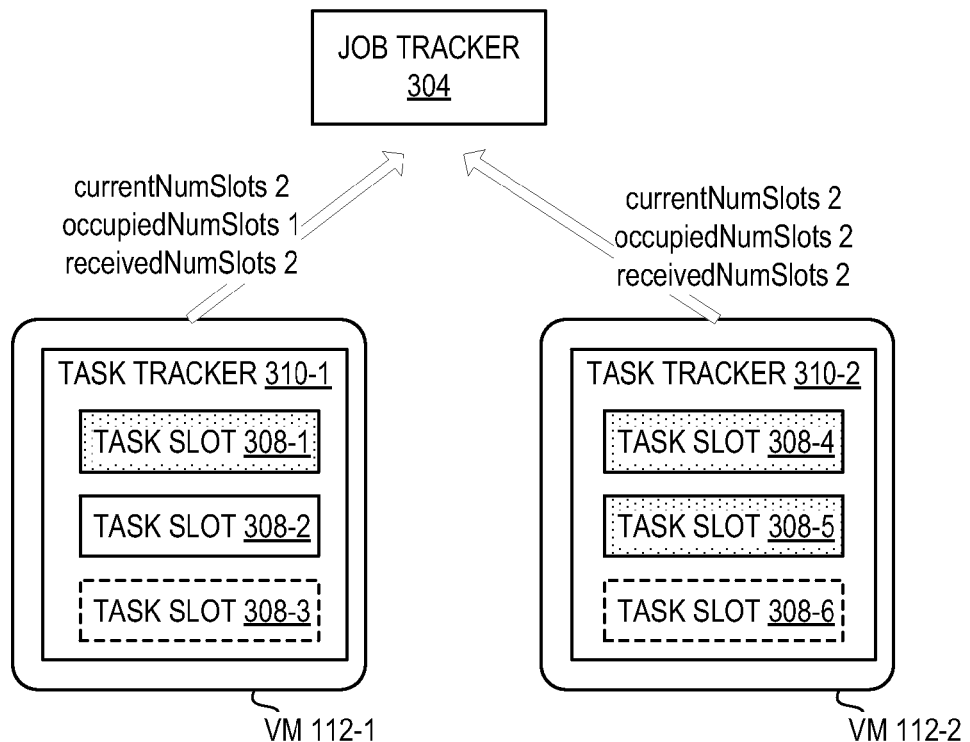

FIGS. 5A-5B is a block diagram that illustrates an example of dynamically allocating task slots, according to one embodiment of the present invention. In the embodiment shown in FIG. 5A, VMs 112-1 and 112-2 are configured as task nodes for Hadoop application 302 and include task trackers 310-1 and 310-2, respectively. Task tracker 310-1 includes one active task slot 308-1 and two inactive task slots 308-2 and 308-3 (depicted in dash lines), while task tracker 310-2 includes three active task slots 308-4, 308-5, and 308-6. Task slots 308-1, 308-4, 308-5 are also currently occupied with a task (depicted with hash marks). As shown, job tracker 304 transmits a heartbeat message to both task trackers indicating an updated allocation of two task slots (e.g., newNumSlots=2).

FIG. 5B shows changes at the task trackers responsive to the updated task slot allocation. To reach the increased number of task slots, task tracker 310-1 marks as active task slot 308-2 to reach the new number of task slots (e.g., 2 task slots) as active. Task slot 308-2 may be advertised in the heartbeat response as available for accepting a task assignment from job tracker 304. Task slot 308-3 remains inactive. Task tracker 310-1 transmits a heartbeat response to job tracker 304 indicating the current number of tasks slots (i.e., currentNumSlots=2), the number of occupied task slots (i.e., occupiedNumSlots=1), and a confirmation of the number of task slots received in a previous task slot allocation (i.e., receivedNumSlots=2). With regards to task tracker 310-2, one task slot must be marked inactive to reach the decreased number of task slots. As shown, the task tracker 310-2 selects task slot 308-6 which is currently unoccupied and marks the task slot as inactive. Task tracker 310-2 transmits a heartbeat response to job tracker 304 indicating the current number of task slots (i.e., currentNumSlots=2), the number of occupied task slots (i.e., occupiedNumSlots=2), and a confirmation of the number of task slots received in a previous heartbeat message (i.e., receivedNumSlots=2).

Figure 6:
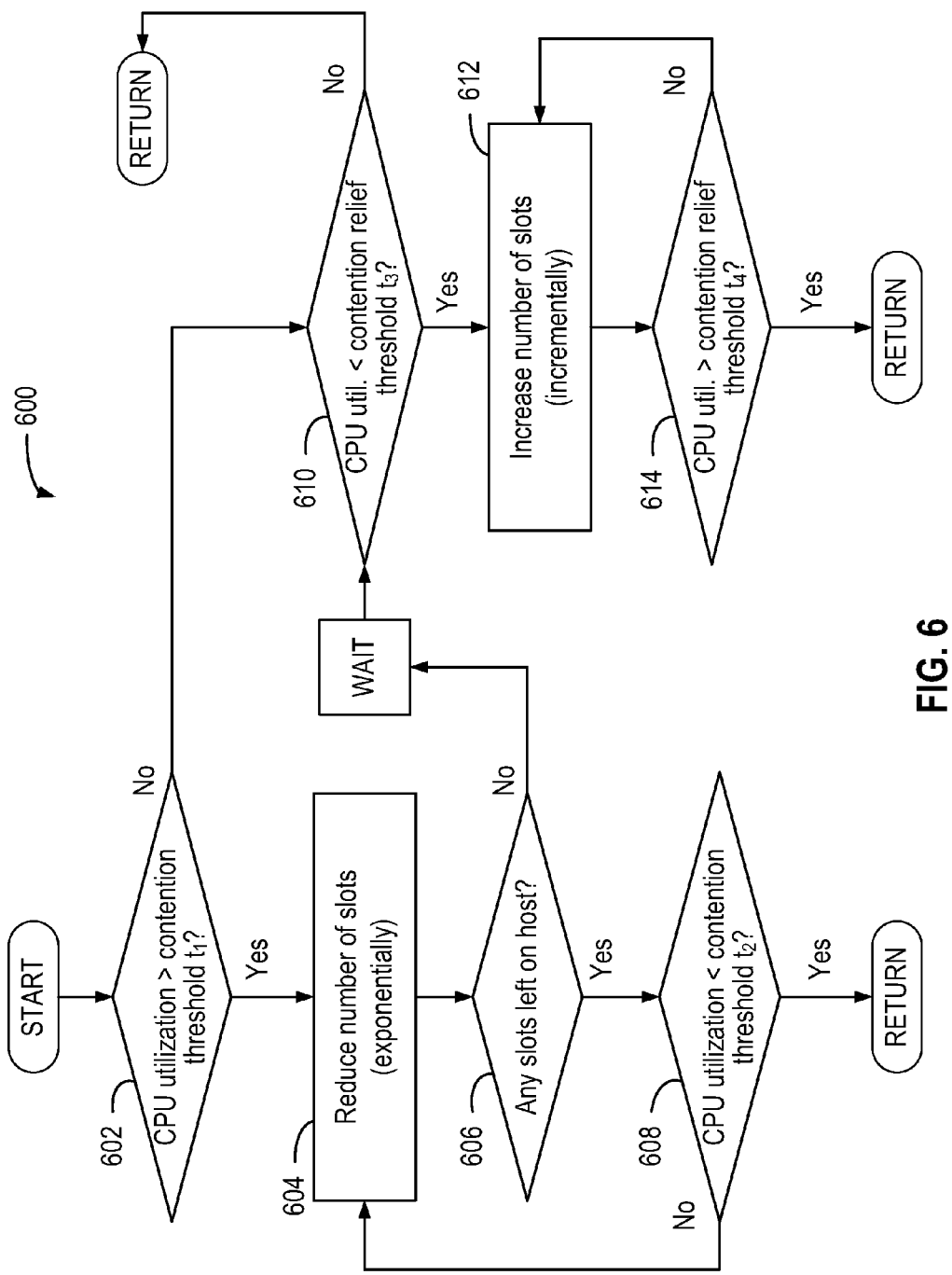
FIG. 6 is a flow diagram that illustrates steps for a method calculating the number of task slots based on resource utilization, according to an embodiment of the present invention.

According to one embodiment, once control module 132 detects resource contention is appearing or disappearing, the control module may calculate task nodes' task slots accordingly. As such, control module 132 may increase the task slot allocation to prevent resources of the system from being under-utilized. To avoid thrashing and other cyclical issues, multiple threshold values may be used for detecting resource contention. In one embodiment, two threshold values $t_1$ and $t_2$ ($t_1 > t_2$) may be used to detect resource contention, and two threshold values $t_3$ and $t_4$ ($t_3 < t_4$) may be used to detect resource contention relief, as shown in FIG. 6. In some embodiments, the threshold values $t_1, t_2, t_3, t_4$ may be selected such that the threshold for resource contention is higher than the threshold for resource contention relief (i.e., $t_1 > t_3$), multiple thresholds for resource contention are higher than the threshold for resource contention relief (i.e., $t_3 < t_2 < t_1$), and multiple thresholds for resource contention relief are lower than the threshold for resource contention relief (i.e., $t_3 < t_4 < t_1$).

FIG. 6 is a flow diagram that illustrates steps for a method 600 for calculating the number of task slots based on resource utilization, according to an embodiment of the present invention. It should be recognized that the steps of method 600 correspond to sub-steps of one embodiment of steps 404 and 406 of FIG. 4 (i.e., steps for detecting a state of resource contention and determining changes to task slot allocation). It should be further recognized that, even though the method is described in conjunction with the system of FIGS. 1 and 3, any system configured to perform the method steps is within the scope of embodiments of the invention.

The method 600 begins at step 602, where control module 132 detects when CPU utilization on one or more hosts 108 goes above a first threshold value $t_1$ that defines an upper threshold of resource contention. If the CPU utilization exceeds $t_1$, control module 132 deems there to be a state of resource contention within the one or more hosts and, at step 604, reduces the number of available Hadoop task slots on that host. It is appreciated that CPU utilization may decrease when the number of task slots (and therefore the number of tasks running in parallel for the Hadoop application) is reduced, and conversely, CPU utilization may increase when the number of task slots is increased.

In one embodiment, control module 132 may continue to reduce the task slot number until either the resource contention is no longer detected (e.g., as defined by threshold $t_2$), or the number of task slots on that host has been reduced to zero. As shown in FIG. 6, at step 606, if no task slots remain for the host, control module 132 may infer that the distributed computing application workload is not contributing to the high CPU load because Hadoop application is not consuming any resources on the host. Control module 132 may proceed to step 610 to wait until CPU utilization returns to normal (e.g., a spike from other workloads passes).

Otherwise, if there are still task slots left on the host, at step 608, control module 132 detects whether CPU utilization has dropped below a second threshold value $t_2$ that defines a lower threshold of resource contention. If CPU utilization has been reduced to threshold value $t_2$, control module 132 returns to the start of method 600 to continue monitoring CPU utilization. If CPU utilization has not been reduced to less than or equal to the second threshold value $t_2$, control module 132 determines this to be a continued state of resource contention and continues to (e.g., at step 604) reduce the number of task slots for that host.

In some embodiments, control module 132 may reduce the number of task slots associated with the host determined to have resource contention by a fixed increment (e.g., reduced by 2 slots each time). In other embodiments, control module 132 may dynamically change the increment by which the number of task slots is reduced. Control module 132 may reduce the number of task slots associated with the host determined to have resource contention in an exponential manner to rapidly relieve any resource contention on the host caused by the Hadoop workload. For example, control module 132 may at first reduce the number of task slots by 8 slots, and when resource contention persists, reduce by 16 slots, then 32 slots, and so forth.

In one embodiment, control module 132 may use threshold values (e.g., $t_3$ and $t_4$) to detect a state of resource contention relief and decide when Hadoop task slots may be reactivated and restored to full use. At step 610, if control module 132 does not detect or no longer detects resource contention, control module 132 determines whether CPU utilization is less than a third threshold value $t_3$ defining a lower bound of contention relief. If so, control module 132 determines that the system may be under-utilized, and at step 612, increases available Hadoop task slots on that host. In some embodiments, control module 132 may incrementally increase the number of tasks slots associated with the under-utilized host by a fixed increment (e.g., increase by 2 slots each time). In other embodiments, control module 132 may dynamically change the increment by which the number of task slots is increased (e.g., increased exponentially.)

Control module 132 may continue to increase the task slot number until either the system is no longer under-utilized (e.g., as defined by threshold $t_4$), or until the resources consumed by Hadoop application 302 reaches the total amount of resources allocated to task nodes at the time of VM provisioning. In some embodiments, control module 132 may determine the system is no longer under-utilized when CPU utilization exceeds a fourth threshold value $t_4$ that defines an upper bound of contention relief, such as at step 614. Accordingly, embodiments of the present invention enable the Hadoop application to shrink down gracefully when business-critical applications are present and to scale up elegantly during low demand periods to maintain a high level of utilization across the virtualized computing system.

In one embodiment, the rate of increase and rate of decrease in the number of task slots may be based on a lower priority level of application workloads relative to non-application workloads. To prevent Hadoop tasks from business-critical application, control module 132 may be conservative when increasing the number of task slots and aggressive when reducing task slots. According to one embodiment, as shown in FIG. 6, control module 132 may decrease slots exponentially when contention is detected, thereby causing Hadoop to quickly give up resources to other contending applications, and increase slots incrementally to avoid re-triggering resource contention and cyclical effects.

According to one embodiment, control module 132 may maintain a log that records when resource contention is detected, what changes to task slots are made, and when resource contention is relieved. Control module 132 may incorporate this historical log in its decision making process when determining changes (e.g., how many slots, which slots) to task slots. In one embodiment, control module 132 tracks the increase and decrease in the number of task slots and corresponding changes to Hadoop nodes resource consumption, and uses the data to learn how fast it should increase and decrease the task slots. For example, if a control module detects a host's CPU consumption is above target 10%, and historical data shows decreases one slot in average decreases 2% CPU utilization, the control module may determine to reduce by 5 task slots (i.e., 10%/2%=5). As such, control module 132 may be self-learning and learn how changes to the Hadoop application (e.g., changes in slot allocation) affect a particular infrastructure (e.g., computing system 100, 300) hosting the Hadoop application. Accordingly, embodiments of the present invention enable a distributed computing application having a control module 132 to advantageously adapt to a variety of virtualized computing systems, which could have different hardware resources, different system requirements, and shared workloads.

While method 600 describes a control flow for controlling CPU resources, it should be recognized that the techniques described may be applied to other computing resources, such as memory utilization, storage bandwidth, I/O resources, etc. In one embodiment, control module 132 may include separate workflows (e.g., method 600) for CPU and memory utilization which may independently cause changes to the number of task slots. In some embodiments, at times when both resource utilizations (e.g., CPU and memory) indicate changes are need to the task slot number, control module 132 may choose a smaller slot number of the two determined number of task slots.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing resources for a first application comprising a distributed computing application, the method comprising:
    receiving a first performance metric for a host computer having a first plurality of virtual machines (VMs) controlled by the distributed computing application and a second plurality of VMs controlled by a second application separate from the distributed computing application;
    determining a state of resource contention between the distributed computing application and the second application based on the first performance metric, wherein it is determined that there is no state of resource contention if VMs controlled by the distributed computing application are primary contributors to the first performance metric;

modifying an allocation of task slots associated with the host computer based on the first performance metric, wherein each task slot represents a capability to receive a unit of work for the distributed computing application; and transmitting the modified allocation of task slots to a scheduler, wherein the scheduler is configured to assign a plurality of tasks to be executed in the first plurality of VMs controlled by the distributed computing application based on the modified allocation of task slots.

2. The method of claim 1, wherein the determining the state of resource contention further comprises:
determining the first performance metric for CPU utilization of the host computer exceeds a first threshold value.

3. The method of claim 1, further comprising:
determining a continued state of resource contention based on a second performance metric for the host computer, wherein the second performance metric is obtained subsequent to the first performance metric; and
exponentially reducing the allocation of task slots associated with the host computer.

4. The method of claim 3, wherein the exponentially reducing the allocation of task slots further comprising: exponentially reducing the allocation of task slots until CPU utilization of the host computer is less than a second threshold value.

5. The method of claim 1, further comprising:
determining a state of resource contention relief between the distributed computing application and the second application based on a second performance metric for the host computer obtained subsequent to the first performance metric; and
increasing the allocation of task slots associated with the host computer based on the second performance metric in an incremental manner.

6. The method of claim 1, wherein the modifying the allocation of task slots further comprising:
determining task slots to be modified based on a historical log comprising changes to the allocation of task slots and corresponding changes to resource consumption of the distributed computing application.

7. The method of claim 1, wherein the allocation of task slots associated with the host computer comprises an allocation of task slots for each of the first plurality of VMs controlled by the distributed computing application.

8. A method for managing resources for a first application comprising a distributed computing application, the method comprising:
receiving an allocation of task slots associated with a host computer having a first plurality of virtual machines (VMs) controlled by the distributed computing application and a second plurality of VMs controlled by a second application, wherein the first plurality of VMs comprises a first task node;
determining an assignment of a first task for the distributed computing application to a first task slot on the first task node based on the received allocation of task slots, wherein the received allocation of task slots includes an allocation of task slots for the first task node; and
transmitting, to the first task node, a heartbeat message having the assignment of the first task and the allocation of task slots for the first task node, wherein each task slot represents a capability to receive a unit of work for the distributed computing application;

wherein the allocation of task slots is determined based on a determination of a state of resource contention between the distributed computing application and the second application based on a performance metric for the host computer indicating resource consumption of the distributed computing application and the second application, wherein it is determined that there is no state of resource contention if VMs controlled by the distributed computing application are primary contributors to the first performance metric.

9. The method of claim 8, further comprising:
receiving, from the first task node, a heartbeat response indicating an updated status and availability of the first task node; and
determining an assignment of a second task for the distributed computing application to the first task node based on the received allocation of task slots and on the updated status and available of the first task node.

10. The method of claim 8, wherein the modifying the allocation of task slots further comprises:
exponentially reducing the allocation of task slots associated with the host computer responsive to determining the first performance metric for CPU unitization of the host computer exceeds a first threshold value.

11. The method of claim 8, further comprising:
determining a state of resource contention relief between the distributed computing application and the second application based on a second performance metric for the host computer obtained subsequent to the first performance metric; and
increasing the allocation of task slots associated with the host computer based on the second performance metric in an incremental manner.

12. The method of claim 8, wherein the modifying the allocation of task slots further comprising:
Determining task slots to be modified based on a historical log comprising changes to the allocation of task slots and corresponding changes to resource consumption of the distributed computing application.

13. A method for managing resources of a host computer having a first plurality of virtual machines (VMs) controlled by a distributed computing application and a second plurality of VMs controlled by a second application separate from the distributed computing application, wherein the first plurality of VMs comprises a first task node, the method comprising:
receiving an allocation of task slots for a first task tracker executing on one of the first plurality of VMs;
modifying at least one of a plurality of task slots managed by the first task tracker based on the allocation of task slots, wherein each task slot represents a capability to receive a unit of work for the distributed computing application;
wherein the modification of the task slots depends on a determination of a state of resource contention between the distributed computing application and the second application based on a performance metric that indicates resource consumption of the distributed computing application and the second application;
wherein it is determined that there is no state of resource contention if VMs controlled by the distributed computing application are primary contributors to the first performance metric; and
transmitting, to a job tracker, a heartbeat message indicating an updated status and availability of the plurality of task slots.

14. The method of claim 13, wherein the modifying at least one of the plurality of task slots based on the allocation of task slots further comprises:

responsive to determining the received allocation of task slots is less than a current number of task slots, marking an available task slot as inactive such that availability of inactive task slots is not advertised in the transmitted heartbeat message.

15. The method of claim 13, wherein the modifying at least one of the plurality of task slots based on the allocation of task slots further comprises:

responsive to determining the received allocation of task slots is less than a number of occupied task slots, marking an occupied task slot as inactive upon completion of a unit of work corresponding to the occupied task slot.

16. The method of claim 13, wherein the modifying at least one of the plurality of task slots based on the allocation of task slots further comprises:

responsive to determining the received allocation of task slots is greater than a current number of task slots, marking an inactive task slot as active; and advertising availability of the marked task slot within the updated status and availability transmitted in the heartbeat message.

17. The method of claim 13, wherein the modifying at least one of the plurality of task slots based on the allocation of task slots further comprises:

determining the received allocation of task slots is less than a current number of task slots; and suspending operation of an instance of a runtime environment corresponding to an available task slot, wherein the instance of the runtime environment is configured to perform a unit of work assigned to a corresponding task slot.

18. The method of claim 13, wherein the modifying at least one of the plurality of task slots based on the allocation of task slots further comprises:

determining the received allocation of task slots is less than a number of occupied task slots;

preemptively aborting operation of an instance of a runtime environment corresponding to an occupied task slot and performing a unit of work assigned to the corresponding occupied task slot.

19. The method of claim 13, wherein the heartbeat message indicating the updated status and availability of the plurality of task slots comprises a current number of task slots and a number of occupied task slots associated with the first task tracker.

\* \* \* \* \*